United States Patent [19]

Honda et al.

[11] Patent Number: 5,189,143

[45] Date of Patent: Feb. 23, 1993

[54] PROCESS FOR PREPARING POLYTETRAFLUOROETHYLENE GRANULAR POWER

[75] Inventors: Norimasa Honda; Kazuhide Sawada; Kenjiro Idemori; Hirokazu Yukawa, all of Settsu, Japan

[73] Assignee: Daikin Industries, Ltd., Osaka, Japan

[21] Appl. No.: 693,193

[22] Filed: Apr. 30, 1991

[30] Foreign Application Priority Data

May 1, 1990 [JP] Japan ................................ 2-116265
May 15, 1990 [JP] Japan ................................ 2-124615

[51] Int. Cl.$^5$ ................................................ C08F 6/16
[52] U.S. Cl. ...................................... 528/498; 528/499; 528/502
[58] Field of Search .................. 528/502, 498, 499

[56] References Cited

U.S. PATENT DOCUMENTS

| | | | |
|---|---|---|---|
| 3,781,258 | 12/1973 | Kometani et al. | 528/494 |
| 3,915,916 | 10/1975 | Leverett | 260/29.6 |
| 3,929,721 | 12/1975 | Leverett | 260/42.15 |
| 4,241,137 | 12/1989 | Izumo et al. | 428/402 |
| 4,370,436 | 1/1983 | Nakamura et al. | 524/322 |

FOREIGN PATENT DOCUMENTS 1100388  1/1968  United Kingdom .

Primary Examiner—Joseph L. Schofer
Assistant Examiner—Tom Weber
Attorney, Agent, or Firm—Armstrong, Westerman, Hattori, McLeland & Naughton

[57] ABSTRACT

A process for preparing a PTFE granular powder, which comprises agitating a PTFE powder having an average particle size of not more than 200 μm in a two-phase liquid medium comprising water and at least one halogenated hydrocarbon selected from the group consisting of 1,1-dichloro-2,2,2-trifluoroethane, 1,1-dichloro-2,2,3,3,3-pentafluoropropane and 1,3-dichloro-1,1,2,2,3-pentafluoropropane. The PFTE powder may contain a hydrophilic filler surface-treated with an organosilane or a silicone resin. By using the particular halogenated hydrocarbon, the problemed environmental damage can be reduced, and loss of filler can be decreased.

8 Claims, No Drawings

PROCESS FOR PREPARING POLYTETRAFLUOROETHYLENE GRANULAR POWER

BACKGROUND OF THE INVENTION

The present invention relates to a process for preparing polytetrafluoroethylene (hereinafter referred to as "PTFE") granular powder.

The molding powder of PTFE is a PTFE powder prepared by finely dividing coarse particles obtained by suspension polymerization, and it has been used for molding by means of compression molding or ram extrusion molding. The particle size of the finely devided PTFE particles (primary particle size) is 5 $\mu$m at the smallest and up to about 1,000 $\mu$m, usually has an average particle size of not more than 100 to 200 $\mu$m.

The PTFE powder is used in the form of powder as it is, because PTFE is different from thermoplastic resins or melt-processable resins, and cannot be thermally processed. Accordingly, the particular powder characteristics are required for the PTFE molding powder. One of the characteristics is a good powder flowability, and others are a high bulk density, less destructible and not too brittle.

Generally, the PTFE primary powder is used for molding by agitating the powder in a liquid medium to agglomerate and then granulating, because the primary powder does not have the above-mentioned powder properties. The method for granulating is roughly classified into a dry mixing method or a wet mixing method. The former is a method using a water-insoluble organic liquid alone and the latter is a method using water a two-phase liquid medium of water and a water-insoluble organic liquid. The wet mixing method is superior to the dry mixing method because an automation of granulation process can be relatively easy, though a separation step and a drying step after the aqueous treatment are required.

The present invention relates to the latter method, i.e. the wet mixing method. Hitherto, suitable organic liquids used in the wet mixing method are organic liquids having a surface tension of not more than 35 dynes/cm at 25° C. and a boiling point of about 30° to 150° C. (Japanese Examined Patent Publication No. 22619/1969, No. 40099/1979, Japanese Unexamined Patent Publication No. 18730/1982, etc.). Examples of the organic liquids are chlorofluorohydrocarbons as well as aliphatic hydrocarbons and aromatic hydrocarbons. Examples of the chlorofluorohydrocarbons used in the conventional method are perhalohydrocarbons such as trichlorotrifluoroethane, monofluorotrichloromethane, difluorotetrachloroethane, $Cl(CF_2CFCl)_nCl$, and trichloropentafluoropropane. In the actual plants, the perhalohydrocarbons are mainly used.

The perhalohydrocarbons are preferable as the organic liquid used in the wet mixing method in view of incombustibility and recovery of solvent. However, since the perhalohydrocarbons have a relatively high boiling point (80° to 130° C.), the recovering temperature becomes higher, and the granular powder is exposed to a high temperature, which makes the resultant particles hard. The hard granular powders provide a molded article having a rough surface and a low tensile strength, elongation, gas permeability and electric insulation. Further, there is a disadvantage of high energy cost for recovering. In addition, it is said that the perhalohydrocarbon is one factor of destroyment of the ozone layer, and therefore use of the perhalohydrocarbon is not desirable.

As a result of the present inventor's intensive study in order to find an organic liquid being capable of solving the above-mentioned problems instead of the perhalohydrocarbons, the particular halogenated hydrocarbons having 2 to 3 carbon atoms, at least on fluorine atom and at least one hydrogen atom are commercially advantageous, and have excellent in powder properties and low influences to the ozone layer, as well as give a molded article improved in various properties, then the present invention has been completed.

SUMMARY OF THE INVENTION

According to the present invention there can be provided a process for preparing a PTFE granular powder, which comprises agitating a PTFE powder having an average particle size of not more than 200 $\mu$m in a two-phase liquid medium comprising water and at least one halogenated hydrocarbon (hereinafter referred to as "particular halogenated hydrocarbon") selected from the group consisting of 1,1-dichloro-2,2,2-trifluoroethane, 1,1-dichloro-1-fluoroethane, 1,1-dichloro-2,2,3,3,3-pentafluoropropane and 1,3-dichloro-1,1,2,2,3-pentafluoropropane.

DETAILED DESCRIPTION

The particular halogenated hydrocarbon used in the present invention has less influence to the ozone layer, and has a boiling point of not too low as well as not too high, and has a surface tention at 25° C. of not more than 35 dynes/cm. The particular halogenated hydrocarbon is 1,1-dichloro-2,2,2-trifluoroethane (surface tension (25° C.): 17 dynes/cm, boiling point: 27° C.), 1,1-dichloro-1-fluoroethane (20 dynes/cm, 32° C.), 1,1-dichloro-2,2,3,3,3-pentafluoropropane (16 dynes/cm, 51° C.), 1,3-dichloro-1,1,2,2,3-pentafluoropropane (18 dynes/cm, 56° C.), or a mixture thereof. Among them, the dichloropentafluoropropanes are preferable, because of their low cost for recovery and their higher degree of improved properties of the powder and molded article. When a boiling point of the organic liquid is higher, the resultant granular is easy to be destroyed by a force from outside. Preferred boiling point range of the organic liquid is 40° to 60° C. The particular halogenated hydrocarbon may be used alone or in a mixture. Also, if necessary, other organic liquids which are conventionally used may be added.

The particular halogenated hydrocarbon is mixed with water to form the two-phase liquid medium. The mixing ratio is different depending on kinds of the particular halogenated hydrocarbon and the desired average particle size. The ratio of water/particular halogenated hydrocarbon is usually 20/1 to 3/1, preferably 10/1 to 5/1 (weight ratio). Water and the particular halogenated hydrocarbon are generally used in an amount of about 2 to 10 l and about 0.2 to 2.0 l, respectively, based on 1 kg of the PTFE powder.

The PTFE powder used in the present invention is, for instance, a homopolymer of tetrafluoroethylene (hereinafter referred to as "TFE") and a copolymer of TFE modified with a copolymerizable monomer of not more than 2% by weight. Examples of the modifiers are, for instance, a perfluoroalkene having 3 to 6 carbon atoms (e.g. hexafluoropropylene), perfluoro(alkylvinylether) having 3 to 6 carbon atoms (e.g. perfluoro(propylvinylether)) or chlorotrifluoroethylen and the like. These copolymers are not melt-processable as of the PTFE homopolymer. These polymers are used as a powder pulverized to an average particle size of not more than 200 μm.

According to the process of the invention, the conventional wet granulation processes of the PTFE powder can be employed except that the particular halogenated hydrocarbon is used as the organic liquid.

Namely, the PTFE powder is agitated in the two-phase liquid medium to granulate the powder at a temperature of approximately 10° to 50° C., preferably 20° to 40° C. Though powder properties of the obtained granular powder varies with the agitation conditions, the usual agitation conditions in the conventional wet granulation methods can be employed in the present invention. The conventional PTFE wet granulation methods are described in Japanese Examined Patent Publication No. 1549/1972, No. 17855/1974 and Japanese Unexamined Patent Publication No. 34936/1972 in addition to the aforementioned publications.

The PTFE granular powder obtained by the process of the present invention has an average particle size of 200 to 800 μm, a bulk density of about 0.50 to 1.00 g/cc and a powder flowability (angle of repose) of about 30 to 45 degrees, particularly 30 to 40 degrees. This granular powder is relatively soft as well as excellent in powder properties, and has a good pressure transmission at pressure molding step, and therefore gives a dense molded article having an excellent tensile strength and elongation and having a low gas permeability.

In order to improve an abrasion resistance and hardness of a PTFE molded article, a hydrophilic or semi-hydrophilic filler (hereinafter referred to as "(semi-)hydrophilic filler") may be mixed with the PTFE powder to incorporate uniformly into the PTFE granular powder.

A difficulty has been encountered in the uniform mixing of the PTFE powder with the (semi-)hydrophilic filler like a glass powder, because the (semi-)hydrophilic filler tends to transfer easily into an aqueous phase. As a result, an agglomerated PTFE granular powder containing all of the (semi-)hydrophilic filler used cannot be obtained, and a portion of the filler remains in the treating water. The phenomenon is called as "separation of filler". Also the filler in the granular powder is apt to come off from the obtained granular powder during handling.

In order to solve these problems, there is employed a process in which, prior to the mixing in water, the (semi-)hydrophilic filler is previously subjected to hydrophobic surface treatment, whereby lowering the surface activity near the surface activity of the PTFE powder, or a process in which the mixing is carried out in the water-insoluble organic medium to which a certain compound having the above activity-lowering effect is added at the mixing.

The surface-treating agents containing silicon atom used for the (semi-)hydrophilic filler is known in Japanese Examined Patent Publication No. 47269/1978, No. 40099/1979, No. 7164/1982, No. 21694/1985, etc., and is an organosilane having an amino functional group or a silicone resin. Examples of the surface-treating agent used in the present invention are, for instance, amino functional organosilanes such as γ-aminopropyltriethoxysilane, m- or p-aminophenyltriethoxysilane, γ-ureidopropyltriethoxysilane, γ-anilinopropyltrimethoxysilane, γ-(2-aminoethyl)aminopropyltrimethoxysilane and γ-(2-aminoethyl)aminopropyl-methyldimethoxysilane; water-soluble silicone resins such as dimethylsiloxane, phenylmethylsiloxane, monophenylsiloxane and propylphenylsiloxane. The amount of the surface-treating agent is not particularly limited, and is usually 0.001 to 10% by weight, preferably 0.1 to 1.0% by weight based on the (semi-)hydrophilic filler.

As the (semi-)hydrophilic fillers used in the present invention there can be employed, for instance, hydrophilic fillers such as powdered glass fibers, glass beads, molten silica powders, crystaline silica powders, white carbon powders, almina powders and bronze powders, and semi-hydrophilic fillers such as potassium titanate powders, carbon fiber powders, molybdenum bisulfite powders and graphite powders. The above-mentioned powdered fillers are fillers generally used for the PTFE powder and having a particle size of not more than 200 mesh. The amount of the (semi-)hydrophilic filler is 5 to 40% by weight, preferably 15 to 25% by weight based on the PTFE powder. When the filler is less than 5% by weight, the improved effects of the molded article such as abrasion resistance and creep resistance cannot be obtained. When using more than 40% by weight, the molded article tends to become low in physical properties such as expansion force and elongation.

Particularly applicable fillers in the present invention are colored filles such as bronze powders, carbon fiber powders, molybdenum bisulfite powders and graphite powders.

In the process of the present invention, hydrophobic fillers such as carbon black other than the above-mentioned fillers may be optionally added. The objects of the invention are not inhibited by the use of these fillers.

As a solvent for the surface-treating agent used in the treatment of the (semi-)hydrophilic filler, polar solvents such as ketones, alcohols and water are preferable. Various methods can be employed for the surface-treatment. For example, there may be preferably employed a method in which the (semi-)hydrophilic filler is soaked in an aqueous solution of the amino functional organosilane and pulled up, and desirably dehydrated with a centrifugal machine, then dried and heated at a temperature of not less than 100° C., preferably about 110° to 180° C. A concentration of the aqueous solution of amino functional organosilane or silicone resin is about 0.001 to 10% by weight, preferably approximately 0.1 to 1.0% by weight.

As the fundamental procedures of the wet mixing granulation method, are employed the procedures described in, for example, Japanese Examined Patent Publication No. 22619/1969, No. 1549/1972, No. 17855/1974, and Japanese Unexamined Patent Publication No. 34936/1972, and the like. For instance, the PTFE powder is homogeneously mixed with the (semi-) hydrophilic filler surface-treated with the organosilane. The obtained filler-containing PTFE mixed powder is agitated in the two-phase liquid medium to prepare a slurry, then agglomerated and granulated. Before slurrying, the mixed powder may be pre-mixed in water. In such a case, the water-insoluble organic liquid is added after the pre-mixing to prepare the two-phase liquid medium, and then the granulation step is carried out.

In the present invention may be used a small amount of PTFE dispersion having an average particle size of 0.05 to 0.5 μm in addition to the above-mentioned PTFE powder. The PTFE dispersion can act to prevent the separation of filler, and is particularly useful when a mixing amount of filler is large. Further the addition of the PTFE dispersion can prevent generation of fine powder in the granulation step. Though prevention of producing the fine powder can also be accomplished by pressing a granular powder tightly, the physical properties decrease in that case. When using the PTFE dispersion, since PTFE in the disappear such fine particles, the above-mentioned properties are not lowered and thus the handlability can be improved. It is preferable that an amount of the PTFE dispersion is 0.1 to 2.5% by weight, preferably 0.2 to 2.5% by weight based on the mixed powder of the PTFE powder and the filler. It is preferred to add the dispersion to water before the water-insoluble organic liquid is added.

Examples of the PTFE dispersion used in the present invention are, for instance, a TFE homopolymer or a copolymer of TFE modified with a copolymerizable monomer. Examples of the modifiers are the same as the modifiers of the above-mentioned PTFE powder.

When adding the PTFE dispersion, it is preferable to previously add it to water for the premixing. Anyhow, the PTFE dispersion may be present during the granulation step. The addition of the PTFE dispersion is effective for avoiding the separation of filler and for avoiding the generation of fine powder at the granulation step.

The PTFE granular powder uniformly containing the filler has an average particle size of about 200 to 800 $\mu$m and a bulk density of about 0.50 to 1.00 g/cc, and is excellent in powder flowability and handlability. The molded article obtained by using the filler-containing granular powder is especially excellent in mechanical properties such as tensile strength and elongation.

The present invention is more specifically described and explained by means of the following examples and comparative examples. It is to be understood that the present invention is not limited to the examples, and various changes and modifications may be made in the invention without departing from the sprit and scope thereof.

EXAMPLE 1

A 3 l stainless steel cylindrical granulation tank equipped with two baffles and having a stirring machine with two wings of flat blade, was charged with a liquid mixture of water and the halogenated hydrocarbon shown in Table 1 in the amounts shown in the same Table. To the granulation tank was added 600 g of a PTFE powder having an average particle size of 35 $\mu$m. The mixture was agitated for five minutes at 1200 rpm, and then continued the agitation at 600 rpm for 30 minutes by coagulation.

After agitation, the obtained granular powder was filtered with a seive of 60 mesh. The remaining solid on the sieve was dried at 150° C. for 16 hours in a dry oven to give a granular powder.

The obtained granular powder was determined in average particle size, bulk density and powder flowability (angle of repose). The molded article prepared by using the granular powder was determined in gas permeability, dielectric breakdown voltage, tensile strength and elongation.

The results are shown in Table 1. The above-mentioned measurements were carried out according to the following methods.

Average particle size:

Standard sieves of 10, 20, 32, 48, 60 and 80 mesh ("mesh" in the specification means "inch mesh") are superposed in order from the top, and the powder is placed on the 10 mesh sieve, and screened.

The ratios of the powder remained on each sieve are calculated by percentage by weight. An average particels size ($\mu$m) is the value corresponding to cumulative percentages of 50% on a log probability paper.

Bulk density:

A bulk density of the PTFE granular powder is determined according to Japanese Industrial Standard (JIS)K6891 (A sample is dropped into a 100 cc stainless steel cylindrical container from a damper, and then an exess amount of the sample is cut by sliding a plate. The weight (g) of the sample in the container divided by the volume (cc) is defined as the bulk density (g/cc)).

Powder flowability (angle of repose):

A stainless steel funnel (upper inner diameter: 40 mm, bottom inner diameter: 6 mm, height: 40 mm) with an orifice (inner diameter: 6 mm, length: 3 mm) is set above a floor at a distance of 20 mm. A powder to be tested is introduced to the funnel, goes down through the funnel, and accumulate on the floor, then the top of the accumulated powder reaches to the outlet of the funnel. Since the accumulated powder forms a circular corn, an angle of repose is calculated according to the following equation by a measured bottom radial r(mm) of the corn.

$$\text{Angle of repose} = \tan^{-1}\left(\frac{20}{r}\right)$$

The powder to be tested should be sufficiently demoistured and should remove static electricity therefrom. The measurement is carried out at 23° C.

Gas permeability:

300 g of a powder to be tested is pre-formed with a cylindrical die having an inner diameter of 70 mm under a pressure of 300 mg/cm$^2$. The pre-formed article is heated to 370° C. at 150° C./hr, sintered for 8 hours at 370° C., and cooled to room temperature at 40° C./hr to give a molded article (diameter: about 70 mm height: 80 mm). From this article a tape (thickness: 0.1 mm) is cut out with a lathe. A gas permeability of this tape is measured at 40° C. according to the test of JIS Z-0208 and is represented by the unit of g/m$^2$24 hr.

Tensile strength and elongation:

The PTFE granular powder is pre-formed under a pressure of 500 kg/cm$^2$, sintered at a temperature of 380° C. for 3 hours, and then cooled down to room temperature outside the furnace to give a sheet of 1.5 mm in thickness. A strength and an elongation at break of a test piece prepared by stamping the sheet with a dumbbell Type 3 die defined in JIS K 6031 are regarded as a tensile strength (kg/cm$^2$) and an elongation (%), respectively.

Dielectric breakdown voltage:

A test tape (width: 30 mm, thickness: 0.10±0.01 mm, length: about 1 m) defined in JIS K 6891 is clamped by electric terminals (pair of well polished bronze balls having a diameter of 12.5 mm), and then is loaded by 500 gf. A dielectric breakdown voltage is determined by elevating a voltage constantly from zero at 1 kv/sec in air. This test is repeated 10 times at points apart from each other at a distance of 50 mm or more. An average value represents the dielectric breakdown voltage (KV).

TABLE 1

| | Experiments | | | | Comparative Experiments | |
|---|---|---|---|---|---|---|
| | 1 | 2 | 3 | 4 | 1 | 2 |
| Halogenated hydrocarbon | 1,1-dichloro-2,2,2-trifluoroethane | 1,1-dichloro-1-fluoroethane | 1,1-dichloro-2,2,3,3,3-pentafluoropropane | 1,3-dichloro-1,1,2,2,3-pentafluoropropane | perchloroethylene | tetrachlorodifluoroethane |
| Surface tension (25° C., dyne/cm) | 17 | 20 | 16 | 18 | 32* | 23** |
| Boiling point (°C.) | 27 | 32 | 51 | 56 | 121 | 93 |
| Properties of granular powder | | | | | | |
| Average particle size (μm) | 500 | 520 | 517 | 509 | 730 | 602 |
| Bulk density (g/cc) | 0.73 | 0.72 | 0.75 | 0.75 | 0.58 | 0.78 |
| Angle of repose (degree) | 37 | 36 | 36 | 36 | 39 | 37 |
| Properties of molded article | | | | | | |
| Gas permeability (g/m² · 24 hr) | 0.8 | 0.7 | 0.9 | 0.9 | 2.5 | 1.3 |
| Tensile strength (kg/cm²) | 420 | 433 | 422 | 418 | 403 | 415 |
| Elongation (%) | 370 | 368 | 373 | 370 | 330 | 334 |
| Dielectric breakdown voltage (KV) | 6.5 | 6.5 | 7.0 | 7.0 | 5.5 | 6.0 |

In Table 1, * is the value of surface tension at 20° C., and ** is the value of surface tension at 30° C.

EXAMPLE 2

Surface Treatment of Filler

In a 1.0% by weight aqueous solution of the amino functional organosilane or silicone resin shown in Table 2 was soaked the (semi-)hydrophilic filler shown in the same Table, agitated sufficiently, and then allowed to stand. The precipitated filler was filtered, dried at 120° C. for 12 hours in an oven to give a (semi-)hydrophilic filler which was surface-treated with the organosilane.

Production of Filler-Containing PTFE Granular Powder

A 3 l stainless steel cylindrical granulation tank equipped with two baffles and having a stirring machine with two wings of flat blade, was charged with a liquid mixture of water and the organic liquid shown in Table 2 in the amounts shown in the same Table. To the granulation tank was added 600 g of a mixed powder of a PTFE powder having an average particle size of 35 μm (powder flowability: 1) and the surface-treated (semi-)hydrophilic filler (80:20 by weight). The mixture was agitated for five minutes at 1200 rpm, and then continued the agitation at 600 rpm for 30 minutes to granulate the PTFE powder and the filler by coagulation.

After agitation, the obtained granular powder was filtered with a sieve of 60 mesh. The remaining solid on the sieve was dried at 150° C. for 16 hours in a dry oven to give a granular powder.

The obtained granular powder was determined in average particle size, bulk density and powder flowability. The method article prepared by using the granular powder was determined in tensile strength and elongation. For measuring the degree of filler separation during granulation step, the granulated particles were filtered with a 60 mesh sieve, and the filtrate was filtered again with a filter paper, followed by drying the filter paper to determine a weight of the filler present in the filtrate. Divided the weight of separated filler in filtrate by the weight of filler used, a degree of filler separation (%) is given.

The results are shown in Table 2. The above-mentioned measurements were carried out according to the measurements in Example 1 excepting the powder flowability.

Power flowability

A powder flowability of the PTFE granular powder is determined according to the method described in detail in Japanese Examined Patent Publication No. 21694/1985.

This method is as follows: A measuring apparatus having an upper hopper and an under hopper are employed. The powder flowability is examined by dropping the powder from the upper hopper into the under hopper, then dropping the powder from the under hopper. When the amount of the powder from the under hopper becomes larger, a flowability of the PTFE powder becomes lower.

In view of this point, the powder falling down from the under hopper in a large amount, has a good flowability. In the above measurement the flowability is evaluated by the number of times, i.e. 0 to 7 (more than 7 is represented by 8<). The bigger the number, the better a flowability becomes.

TABLE 2

| | Experiments | | | | |
|---|---|---|---|---|---|
| | 5 | 6 | 7 | 8 | 9 |
| Mixed powder of PTFE and glass powder (g) | 600 | 600 | 600 | 600 | 600 |
| (Semi-)hydrophilic filler | | | | | |
| Kind | glass fiber powder | molten silica | bronze powder | carbon fiber powder | glass beads |
| Average particle size or average fiber length (μm) | 40 | 50 | 40 | 70 | 70 |
| Organosilane for surface-treatment | γ-aminopropyltriethoxysilane | γ-anilinopropyltriethoxysilane | γ-(2-aminopropyl)-aminopropyltri- | γ-aminopropyltriethoxysilane | phenylmethylsiloxane |

TABLE 2-continued

| Kind | | | methoxysilane | | |
|---|---|---|---|---|---|
| Volume of water (ml) | 1300 | 1500 | 1500 | 1500 | 1500 |
| Organic liquid | | | | | |
| Kind | 1,3-dichloro-1,1,2,2,3-penta-fluoropropane | 1,1-dichloro-2,2,3,3,3-penta-fluoropropane | 1,1-dichloro-1-fluoroethane | 1,1-dichloro-2,2,2-trifluoro-ethane | 1,3-dichloro-1,1,2,2,3-penta-fluoropropane |
| (Surface tension: dyne/cm) | (18) | (16) | (20) | (17) | (18) |
| Volume (ml) | 300 | 400 | 300 | 300 | 300 |
| Degree of filler separation (%) | 0.6 | 0.8 | 2.0 | 1.5 | 2.5 |
| Properties of granular powder | | | | | |
| Average particle size (μm) | 520 | 583 | 530 | 510 | 613 |
| Bulk density (g/cc) | 0.73 | 0.69 | 0.82 | 0.67 | 0.70 |
| Powder flowability (times) | 8< | 7 | 7 | 6 | 8< |
| Properties of molded article | | | | | |
| Tensile strength (kg/cm$^2$) | 243 | 240 | 375 | 170 | 260 |
| Elongation (%) | 320 | 300 | 350 | 130 | 350 |

| | Comparative Experiments | |
|---|---|---|
| | 3 | 4 |
| Mixed powder of PTFE and glass powder (g) | 600 | 600 |
| (Semi-)hydrophilic filler | | |
| Kind | molten silica | carbon fiber powder |
| Average particle size or average fiber length (μm) | 50 | 70 |
| Organosilane for surface-treatment Kind | non | phenyltrimethoxysilane |
| Volume of water (ml) | 1500 | 1500 |
| Organic liquid | | |
| Kind | tetrachlorodifluoroethane | carbon tetrachloride |
| (Surface tension: dyne/cm) | (23) | (45) |
| Volume (ml) | 300 | 300 |
| Degree of filler separation (%) | 45.0 | |
| Properties of granular powder | | |
| Average particle size (μm) | 600 | Granulation could not be carried out, because the powders could not be agglomerated in the slurry. |
| Bulk density (g/cc) | 0.77 | |
| Powder flowability (times) | 5 | |
| Properties of molded article | | |
| Tensile strength (kg/cm$^2$) | 160 | |
| Elongation (%) | 283 | |

According to the present invention, a relatively soft PTFE granular powder having good powder properties such as powder flowability and bulk density can be prepared. The used liquid medium can also be easily and efficiently recovered. The obtained PTFE granular powder can give a dense molded article having excellent mechanical properties, even if (semi-)hydrophilic fillers are incorporated into the granular powder.

What is claimed is:

1. A process for preparing a polytetrafluoroethylene granular powder, which comprises agitating a polytetrafluoroethylene powder having an average particle size of not more than 200 μm in a two-phase liquid medium comprising water and at least one halogenated hydrocarbon selected from the group consisting of 1,1-dichloro-2,2,2-trifluoroethane, 1,1-dichloro-1-fluoroethane, 1,1-dichloro-2,2,3,3,3-pentafluoropropane and 1,3-dichloro-1,1,2,2,3-pentafluoropropane.

2. The process of claim 1, wherein the polytetrafluoroethylene contains a filler.

3. The process of claim 2, wherein the filler is a hydrophilic or semi-hydrophilic filler which is surface-treated.

4. The process of claim 3, wherein the filler is surface-treated with an amino functional organosilane.

5. The process of claim 3, wherein the filler is surface-treated with a silicone resin.

6. The process of claim 1, which is carried out in the presence of a polytetrafluoroethylene dispersion.

7. The process of claim 1, wherein the halogenated hydrocarbon is 1,1-dichloro-2,2,3,3,3-pentafluoropropane.

8. The process of claim 1, wherein the halogenated hydrocarbon is 1,3-dichloro-1,1,2,2,3-pentafluoropropane.

* * * * *